United States Patent [19]

Yamamoto

[11] Patent Number: 4,833,529
[45] Date of Patent: May 23, 1989

[54] COLOR IMAGE PROCESSING SYSTEM WITH A COLOR SEPARATING CIRCUIT WHICH PRODUCES A COLOR IMAGE SIGNAL IN RESPONSE TO A STATUS SIGNAL FROM A COLOR IDENTIFYING CIRCUIT

[75] Inventor: Kazuhito Yamamoto, Isehara, Japan

[73] Assignee: Ricoh Company, Ltd., Tokyo, Japan

[21] Appl. No.: 120,779

[22] Filed: Nov. 16, 1987

Related U.S. Application Data

[63] Continuation of Ser. No. 888,373, Jul. 23, 1986, abandoned.

[30] Foreign Application Priority Data

Jul. 27, 1985 [JP] Japan .................................. 60-165028

[51] Int. Cl.$^4$ .......................... G03F 3/08; H04N 1/46
[52] U.S. Cl. ......................................... 358/75; 358/80
[58] Field of Search ................. 358/75, 78, 80; 382/17

[56] References Cited

U.S. PATENT DOCUMENTS

| | | | |
|---|---|---|---|
| 4,479,242 | 10/1984 | Kurata | 358/75 |
| 4,517,589 | 5/1985 | Baba et al. | 358/75 |
| 4,518,987 | 5/1985 | Saitoh et al. | 358/75 |
| 4,551,750 | 11/1985 | Kurata | 358/75 |
| 4,577,218 | 3/1986 | Kurata | 358/75 |
| 4,591,905 | 5/1986 | Noguchi | 358/75 |
| 4,623,917 | 11/1986 | Noguchi | 358/75 |
| 4,633,301 | 12/1986 | Saitoh | 358/75 |

FOREIGN PATENT DOCUMENTS

| | | | |
|---|---|---|---|
| 60-51369 | 3/1985 | Japan | 358/78 |
| 60-160774 | 8/1985 | Japan | 358/80 |

OTHER PUBLICATIONS

Nakano et al., "Study on Reading and Recording of a Two-Color Image", *Okai Denki Research and Development Report*, Dec. 1980, 111, vol. 47, No. 2, pp. 43-46 (in Japanese).

*Primary Examiner*—James J. Groody
*Assistant Examiner*—Randall S. Svihla
*Attorney, Agent, or Firm*—Oblon, Fisher, Spivak, McClelland & Maier

[57] ABSTRACT

A color separated image processing means includes a plurality of line sensors each receiving a different color-separated light image. The respective light images are converted into corresponding image signals which are respectively normalized with respect to respective reference signals. And, the normalized image signals are compared one from another by a color identifying circuit which supplies as its output a status signal indicating the presence or absence of an intended color for a pixel under examination. The status signal and the normalized image signals are supplied to a color separating circuit which supplies as its output either a first color image signal, which is obtained by carrying out a predetermined calculation using the normalized image signals, or a second color image signal, which corresponds to a predetermined one of the normalized image signals, depending on the state of the status signal. In one embodiment a maximum value detecting circuit is used in the calculation of a corrected first color image signal while in another embodiment a predetermined multiple of one of the reference signals is used to calculate a corrected first color image signal. In one embodiment, the image signals are red and cyan signals, and the first and second color image signals are a red signal and a black and white signal.

6 Claims, 4 Drawing Sheets

Fig. 1
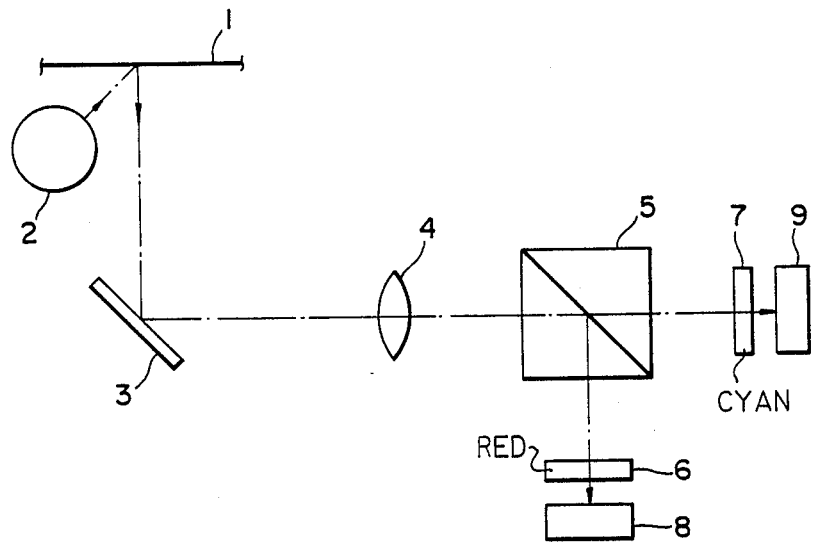
Fig. 3a  ST  
Fig. 3b  D1  
Fig. 3c  D2  
Fig. 3d  Dr  
Fig. 3e  Dw  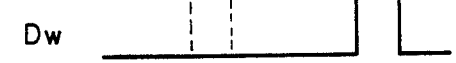

COLOR IMAGE PROCESSING SYSTEM WITH A COLOR SEPARATING CIRCUIT WHICH PRODUCES A COLOR IMAGE SIGNAL IN RESPONSE TO A STATUS SIGNAL FROM A COLOR IDENTIFYING CIRCUIT

This application is a continuation of application Ser. No. 888,373, filed on July 23, 1986, now abandoned.

BACKGROUND OF THE INVENTION

1. Field of the Invention

This invention relates to an image processing system with color discrimination, and, in particular, to an image processing system capable of handling the color information of an image to be processed.

2. Description of the Prior Art

In the case of inputting image information into an image processing system, such as a facsimile machine, it is often convenient if the color information of the image to be input can be identified. For example, it is often the case that an original document to be transmitted by facsimile contains not only messages black in color, but also messages red in color, red stamps and red underlines. In such a case, if such red image information can be transmitted separately from black image information and these black and red image information can be output separately, the transmission of image information can be carried out more effectively.

Various methods for discriminating different colors of an original image have been proposed, and one of such conventional methods is to use one filter for one color in carrying out color separation. However, for example, if a red filter is used to carry out color separation so as to identify the red color, a color containing a red color component beyond a certain level, such as magenta, may be identified as a red color. For this reason, there is a disadvantage in that some colors other than those which are visually discriminated as a red color are often identified as a red color. In addition, in the case where a red color image signal is formed from an input signal containing only a red component in this manner, the light-receiving level becomes relatively low, so that there may be a case where a red image signal cannot be output properly depending on the kind of red color.

SUMMARY OF THE INVENTION

In accordance with the principle of the present invention, an intended color is discriminated from image information obtained by reading an original image, and, for a pixel discriminated as having the intended color, a predetermined arithmetic operation is carried out for the intended color component and its complementary color component so as to form a color image signal corresponding to the intended color.

It is therefore a primary object of the present invention to obviate the disadvantages of the prior art as described above and to provide an improved image processing system with color discrimination.

Another object of the present invention is to provide an improved color separated image processing system capable of reading an intended color component of an original image having a color component.

A further object of the present invention is to provide an improved image processing system capable of forming a color image signal corresponding to an intended color component from an original image having the intended color component.

A still further object of the present invention is to provide an improved image processing system high in performance and reliable in operation.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing an optical system for reading an image to be processed which is suitable for use in a color separated image processing system of the present invention;

FIGS. 3a and 3e are waveform diagrams which are useful for understanding the operation of the system shown in FIG. 2.

DESCRIPTION OF THE PREFERRED EMBODIMENTS

Figure 2:
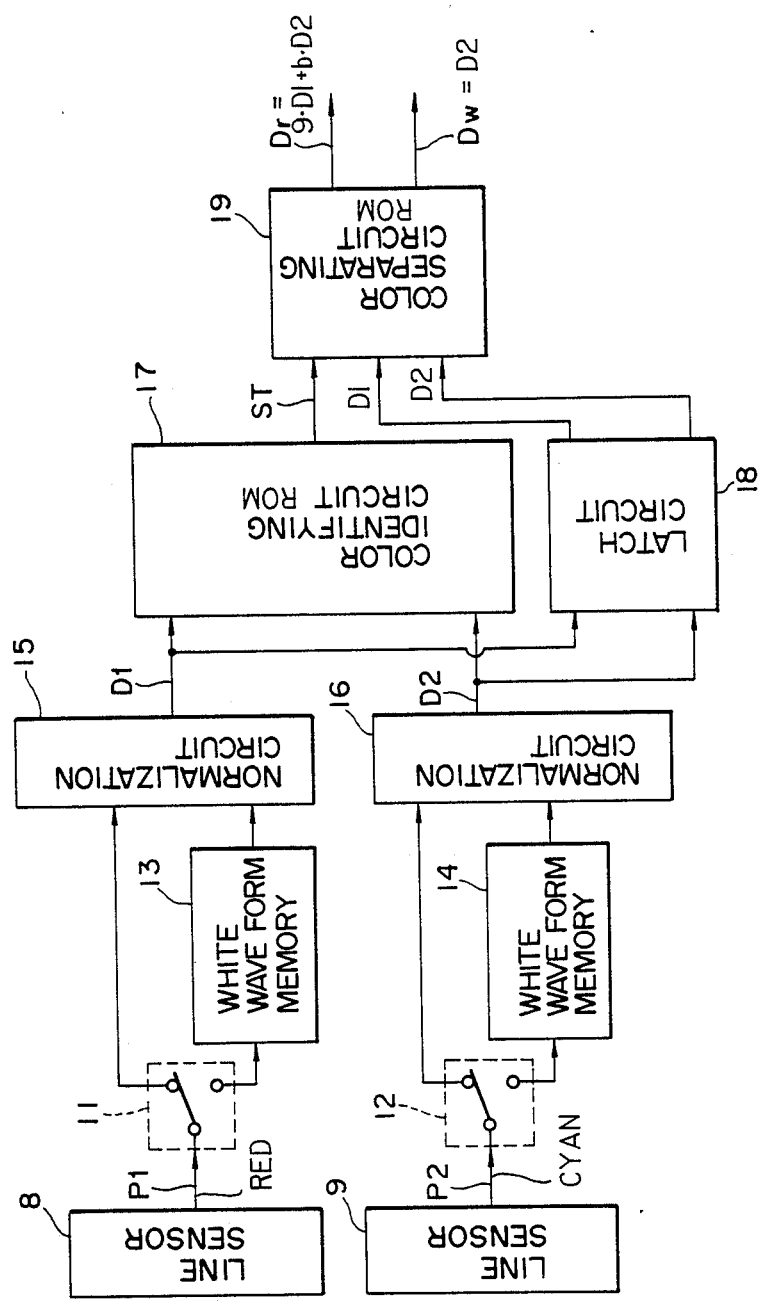
FIG. 2 is a block diagram showing a color separated image processing system constructed in accordance with one embodiment of the present invention.

Referring now to FIG. 1, there is schematically shown an optical system suitable for use in an image processing system of the present invention to optically read an original image to be processed. In the present embodiment, it will be assumed that the red color is to be discriminated. In the optical system illustrated in FIG. 1, an original document 1 to be read is illuminated by a light source 2, and, thus, a light image reflecting from a read line on the original document 1 is reflected by a mirror 3 to be lead into a beam splitter 5, comprised of a half-mirror or prisms, through a lens 4. The light image is then divided into two beams, one of which is lead into a first line sensor 8 through a red filter 6, which allows a red component of the light image to be transmitted therethrough, and the other of which is lead into a second line sensor 9 through a cyan filter 7, which allows a cyan component of the light image to be transmitted therethrough.

The red filter 6 has a transmission lower limit wavelength, for example, of 580 nm, and, thus, it has a characteristic of allowing to transmit light having a wavelength above the transmission lower limit. On the other hand, the cyan filter 7 has a transmission upper limit wavelength, for example, of 620 nm, and, thus, it has a characteristic of allowing to transmit light having a wavelength below the transmission upper limit.

FIG. 2 illustrates in block form a color separated image processing system constructed in accordance with one embodiment of the present invention. It is to be noted that the line sensors 8 and 9 correspond to those elements identically numbered in the structure shown in FIG. 1 and that a control system for controlling the operation of each of the line sensors 8 and 9 is omitted for simplification. In the system shown in FIG. 2, image signals P1 and P2 respectively output from the line sensors 8 and 9 are supplied either to respective white waveform memories 13 and 14 or to respective normalization circuits 15 and 16 by means of selectors, 11 and 12 respectively. When a reference white image, e.g., a white color original, is to be read, the selectors 11 and 12 are set to select the white waveform memories 13 and 14 by a suitable control means (not shown). When so set, reference white image signals P1 and P2 output from the line sensors 8 and 9 are stored into the respective white waveform memories 13 and 14. On the other hand, when the image of the original document 1 is to be read, the selectors 11 and 12 are set to select the normalization circuits 15 and 16 by the control means (not shown).

At the normalization circuits 15 and 16, image signals P1 and P2 obtained by reading the original document 1 are subjected to level conversion using the signals supplied in synchronism with the image signals P1 and P2 from the white waveform memories 13 and 14 as a reference, thereby converting the image signals P1 and P2 into the corresponding digital signals, respectively. The difference in transmission rate between the red and cyan filters 6 and 7 is absorbed by these normalization circuits 15 and 16. Output signals D1 and D2, which are shown in FIGS. 3b and 3c, respectively, from the respective normalization circuits 15 and 16 are supplied to a color identifying circuit 17 for identifying whether a pixel being examined is red in color or not and also to a latch circuit 18. At the color identifying circuit 17, the ratio between the output signals D1 and D2 is calculated and its calculated ratio is then compared with a predetermined value, whereby the pixel under examination is judged whether it is red in color or not depending on the result of the comparison. If the result of the comparison indicates the pixel under examination to be red in color, then a status signal ST, which is shown in FIG. 3a, supplied from the color identifying circuit 17 to a color separating circuit 19 is turned high.

While the status signal ST is maintained high, the color separating circuit 19 calculates a red color signal Dr, which is shown in FIG. 3d, according to the following equation (1).

$$Dr = a \times D1 + b \times D2 \quad (1)$$

Here, D1 and D2 in the above equation (1) are equal to those signals D1 and D2 which are output from the latch circuit 18, and a and b are constants different in sign. These constants a and b are appropriately set in consideration of white balance and emphasis of image.

In this manner, at the color separating circuit 19, since the red color image signal Dr is calculated by multiplication of an appropriate factor, the level of the red color image signal Dr may be increased, so that the red color of various kinds can be output securely. On the other hand, if the status signal ST is not high, the color separating circuit 19 supplies the signal D2 received from the latch circuit 18 as a black and white image signal Dw, which is shown in FIG. 3e, without change. In FIGS. 3a through 3e, each signal is indicated by the level corresponding to its digital value. In addition, while the status signal ST is high, the color separating circuit 19 outputs a signal indicating the current black and white signal Dw being invalid because the pixel under examination is a red pixel. That is, if this black and white signal Dw is a 4-bit digital signal, there is supplied a 4-bit signal whose bits are all "0" or all "1." Similarly, if the status signal ST is low then the pixel under examination is not a red pixel, there is supplied the red color image signal Dr whose bits are all "0" or all "1".

Accordingly, while reading the image on the original document 1, for a pixel of the image on the original document 1 which has been identified as red by the color identifying circuit 17, the red color image signal Dr output from the color separating circuit 19 has a value corresponding to the red color level of the pixel under examination with the black and white image signal Dw corresponding to the pixel under examination having a value indicating it to be invalid. On the other hand, for a pixel of the image on the original document 1 which has not been identified as red by the color identifying circuit 17, the red color image signal Dr has a value indicating it to be invalid and the black and white signal Dw has a value corresponding to the density of the pixel under examination.

In this manner, the red component and the black and white component of the image on the original document are converted into the red color image signal Dr and the black and white image signal Dw, respectively.

It is to be noted that the red and cyan filters and 7 may have other characteristics than described above. Moreover, it is preferably so structured that the constants a and b, shown in the above equation (1), change in order to provide optimal values at all times when either the white balance or the mode of emphasis of the image vary because of the characteristics of the red and cyan filters 6 and 7.

Figure 4:
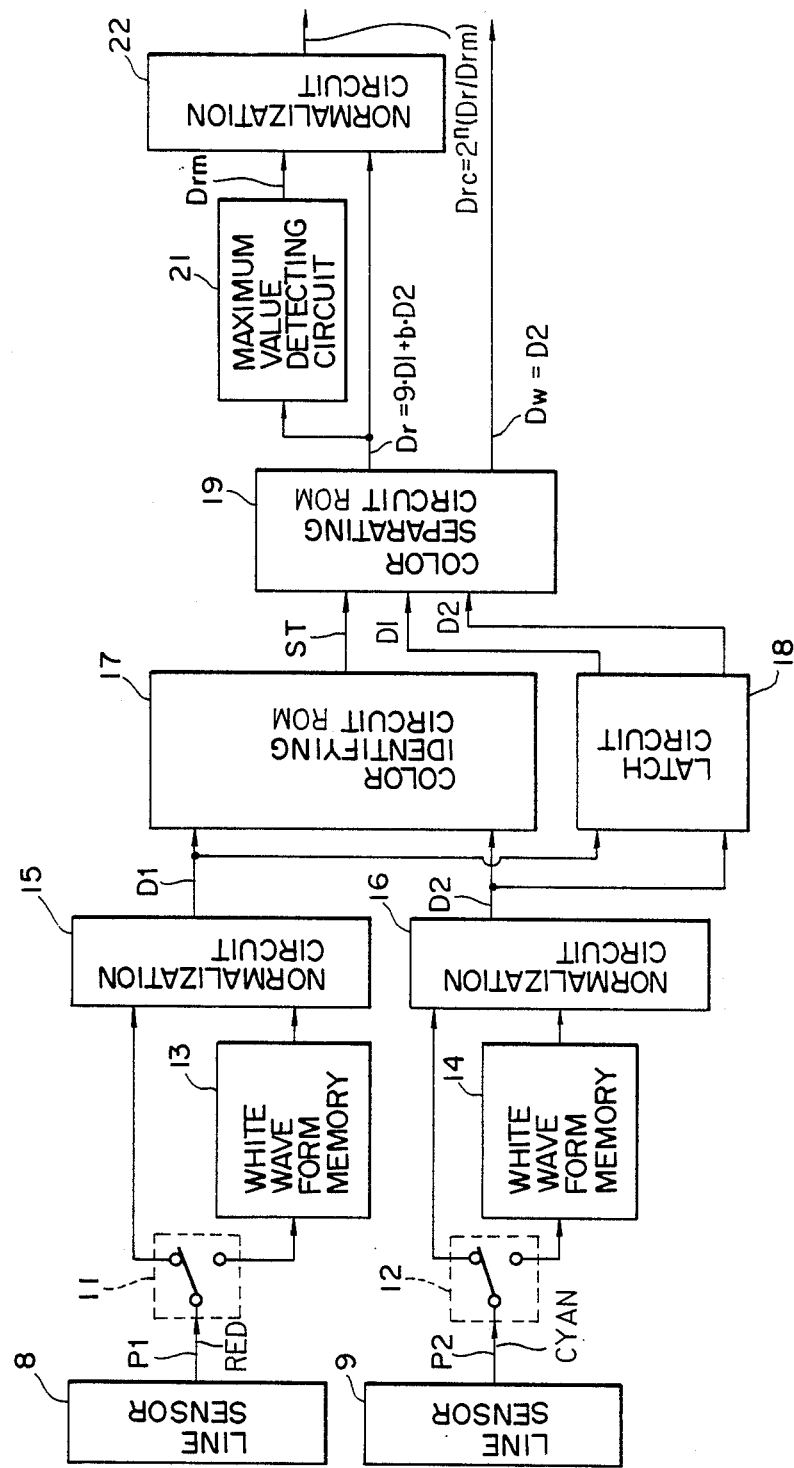
FIGS. 4 and 5 are block diagrams showing color separated image processing systems of the present invention constructed by modifying the system shown in FIG. 2.

Now, referring to FIG. 4, a description will be had with respect to another embodiment which outputs the red color image signal Dr with its tone converted to a predetermined level. It should be noted that those elements in FIG. 4 which are identical to those elements shown in FIG. 2 are indicated by identical reference characters. In the structure shown in FIG. 4, the red color image signal Dr output from the color separating circuit 19 is supplied not only to a maximum value detecting circuit 21, but also to a normalization circuit 22. The maximum value detecting circuit 21 is provided to detect a maximum red color image signal Drm for setting a maximum range of the red color image signal Dr, and this maximum red color image signal Drm is supplied to the normalization circuit 22. The normalization circuit 22 calculates a tone-corrected red color image signal Drc according to the following equation (2)

$$Drc = 2^n \times (Dr/Drm) \quad (2)$$

Here, n is the number of bits of the corrected red color image signal Drc and it is normally same as the number of bits of the black and white image signal Dw. Using this structure, the tone-corrected red color image signal Drc and the black and white image signal Dw are output at the same time.

Incidentally, in the case where the red color image signal Dr has a value indicating the invalid state as described above, the maximum value detecting circuit 21 functions to erase the value of Dr. On the other hand, if the red color image signal has a value indicating the invalid state, the normalization circuit 22 supplies the red color image signal Dr as the corrected red color image signal Drc without change.

The output of the line sensor 8 has a maximum value when it has read the reference white image. Thus, when reading a red image which is very pale and thus difficult to be discriminated from white, the line sensor 8 supplies an output which is larger than those which are output when other red color images are read. Therefore, the level of an output from the line sensor 8 when reading a very pale red color image may be set as a reference level to be used in tone correction in place of the above-described maximum red color image signal Drm.

Figure 5:
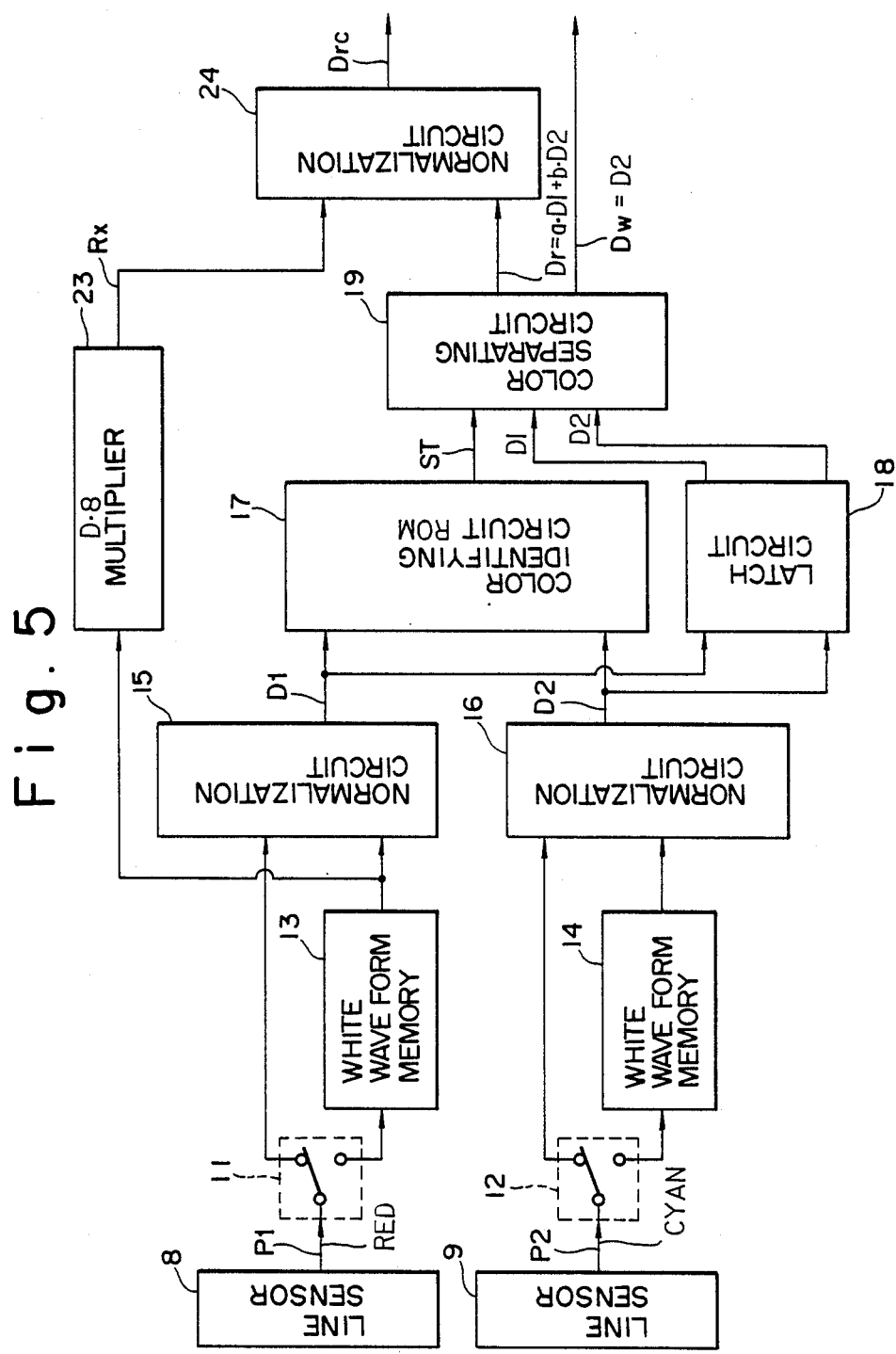

FIG. 5 shows a further embodiment of the present invention, in which those elements which are identical to those shown in FIGS. 2 and 4 are indicated by identical reference characters. In FIG. 5, the output from the white waveform memory 13, which stores the reference level for the line sensor 8, is supplied to a multiplier 23 which multiplies its input signal by a predetermined factor, such as 0.8, to calculate a red reference level signal Rx. And, the red reference level signal Rx is supplied to a normalization circuit 24. With this structure, using the red reference level signal Rx as a reference, the red image signal Dr is output as being converted to an n-bit corrected red color image signal Drc. If the red color image signal Dr supplied from the color separating circuit 19 has a value indicating it to be invalid, the normalization circuit 24 supplies the red color image signal Dr as the corrected red color image signal Drc as it is. In this manner, in this embodiment, since there is n need to detect the maximum value of the red color image signal Dr, it is structurally simpler as compared with the previous embodiment.

In each of the previously described embodiments, the color identifying circuit 17 may be preferably comprised of a ROM, which carries out a table calculation using D1 and D2 as input signals, and, similarly, the color separating circuit 19 may also be comprised of a ROM which carries out a table calculation using the status signal ST and D1 and D2 output from the latch circuit 18 as input signals. Moreover, in the above-described embodiments, the color separating circuit 19 is so structured to supply as its output the red color image signal Dr as a signal having a distinctive level, e.g., as a digital signal having the same number of bits as the black and white image signal Dw; however, the red color image signal Dr may be converted into a binary value internally using a predetermined threshold value, thereby providing an output signal in the binary format. It should also be noted that red was used as a color to be discriminated in each of the above-described embodiments. However, the color to be discriminated in the present invention should not be limited only to red, but any other color may be selected for discrimination. In addition, the present invention may also be so structured to discriminate two or more colors at the same time.

As described above, in accordance with the present invention, an intended color in an original document is discriminated, and, at the same time, for a pixel having the intended color, a predetermined calculation is carried out with respect to the intended color and its complementary color to form a color image signal corresponding to the intended color. As a result, the intended color can be securely read from the original document.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A color-separated image processing system, comprising:
    a plurality of photoelectric means each receiving a color-separated light image from an original image and supplying an image signal representing pixels of the original image;
    a plurality of normalizing means each being fed an associated reference signal and each of said normalizing means being associated with a corresponding one of said plurality of photoelectric means for normalizing the corresponding image signal with reference to the associated reference signal;
    color identifying means associated with an intended color for identifying the presence or absence of said intended color in the original image on a pixel by pixel basis by comparing said normalized image signals output from said plurality of normalizing means with each other, said color identifying means supplying at an output a status signal which has a first state if the result of the comparison indicates the presence of the intended color and a second state if the result of the comparison indicates the absence of the intended color; and
    color separating means responsive to said status signal for supplying at a first output a first color image signal representing said intended color which is formed by carrying out a predetermined calculation using the normalized image signals from said plurality of normalizing means if said status signal has said first state or for supplying at a second output a second color image signal which is a predetermined one of said normalized image signals if said status signal has said second state.

2. The system of claim 1 wherein each of said plurality of photoelectric means includes a line sensor having a plurality of photoelectric elements each defining a pixel of the original image.

3. The system of claim 2 further comprising beam dividing means for dividing a light image from the original image into a plurality of divided light images and a plurality of color-separating filters each disposed to receive a corresponding one of said divided light images to produce a color-separated light image which is supplied to a corresponding one of said line sensors.

4. The system of claim 3 wherein said beam dividing means divides the light image into two divided light images and thus there are provided two color-separating filters, one of which allows light of said intended color to pass therethrough and the other of which allows light of a color complementary to said intended color to pass therethrough.

5. The system of claim 1 wherein said color identifying means includes a ROM having a memory table with predetermined contents.

6. The system of claim 5 wherein said color separating means includes a ROM having a memory table with predetermined contents.

* * * * *